(12) United States Patent
Shin et al.

(10) Patent No.: US 8,395,736 B2
(45) Date of Patent: Mar. 12, 2013

(54) ALIGNMENT SUBSTRATE FOR ALIGNING LIQUID CRYSTAL MOLECULES, LIQUID CRYSTAL DISPLAY PANEL HAVING THE SAME, AND METHOD OF MANUFACTURING THE ALIGNMENT SUBSTRATE

(75) Inventors: Yong-Hwan Shin, Yongin-si (KR);
Baek-Kyun Jeon, Yongin-si (KR);
Kyoung-Tae Kim, Osan-si (KR);
Bong-Sun Seo, Yongin-si (KR);
Mee-Hye Jung, Suwon-si (KR);
Young-Gu Kim, Suwon-si (KR);
Min-Sik Jung, Seoul (KR);
Byoung-Hun Sung, Hwaseong-si (KR);
Jeong-Hye Choi, Incheon (KR);
Sung-Yi Kim, Gwangju-si (KR)

(73) Assignee: Samsung Display Co., Ltd., Yongin (KR)

( * ) Notice: Subject to any disclaimer, the term of this patent is extended or adjusted under 35 U.S.C. 154(b) by 260 days.

(21) Appl. No.: 12/620,269

(22) Filed: Nov. 17, 2009

(65) Prior Publication Data

US 2010/0157223 A1 Jun. 24, 2010

(30) Foreign Application Priority Data

Dec. 22, 2008 (KR) .................. 10-2008-0131162

(51) Int. Cl.
*G02F 1/1337* (2006.01)
(52) U.S. Cl. .................. 349/124; 349/129; 349/187
(58) Field of Classification Search .................. None
See application file for complete search history.

(56) References Cited

U.S. PATENT DOCUMENTS

| 6,268,897 | B1 * | 7/2001 | Kim et al. | 349/124 |
| 6,414,737 | B1 * | 7/2002 | Reznikov et al. | 349/136 |
| 8,120,737 | B2 * | 2/2012 | Yoshida et al. | 349/129 |
| 2007/0030429 | A1 * | 2/2007 | Kim et al. | 349/129 |

* cited by examiner

*Primary Examiner* — Richard Kim
(74) *Attorney, Agent, or Firm* — H.C. Park & Associates, PLC

(57) ABSTRACT

The present invention discloses an alignment substrate that includes a base substrate and an alignment layer arranged on the base substrate. A plurality of unit pixels is defined in the base substrate. The alignment layer includes at least two sub-alignment portions dividing the unit pixel into at least two domains. Each sub-alignment portion is arranged in a different domain of the at least two domains and is aligned to have a different pretilt direction from the other sub-alignment portions.

20 Claims, 10 Drawing Sheets

ALIGNMENT SUBSTRATE FOR ALIGNING LIQUID CRYSTAL MOLECULES, LIQUID CRYSTAL DISPLAY PANEL HAVING THE SAME, AND METHOD OF MANUFACTURING THE ALIGNMENT SUBSTRATE

CROSS REFERENCE TO RELATED APPLICATION

This application claims priority from and the benefit of Korean Patent Application No. 2008-131162, filed on Dec. 22, 2008, which is hereby incorporated by reference for all purposes as if fully set forth herein.

BACKGROUND OF THE INVENTION

1. Field of the Invention

The present invention relates to an alignment substrate, a liquid crystal display (LCD) panel including the alignment substrate, and a method of manufacturing the alignment substrate. More particularly, the present invention relates to an alignment substrate for preventing alignment errors even though a misalignment occurs between two substrates when the substrates are combined, an LCD panel including the alignment substrate, and a method of manufacturing the alignment substrate.

2. Discussion of the Background

An LCD panel includes a lower substrate having a pixel electrode, an upper substrate having a common electrode, and a liquid crystal layer interposed between the lower substrate and the upper substrate. When an electric field is between the pixel electrode and the common electrode, an arrangement of liquid crystal molecules of the liquid crystal layer changes. The optical transmittance of the liquid crystal molecules is controlled by the changed arrangement of the liquid crystal molecules to display an image.

A wide viewing angle is one important factor for improving display quality of the LCD panel. In order to broaden the viewing angle, a patterned vertical alignment (PVA) mode or a super patterned vertical alignment (SPVA) mode that divides a pixel into a plurality of domains has been developed. However, the PVA mode or the SPVA mode requires additional processes for forming a slit pattern or a protrusion pattern to form a multi-domain structure. Further, afterimages or spots may be generated around the slit pattern or the protrusion pattern, or transmittance may be reduced.

In order to form the multi-domain structure without the slit pattern or the protrusion pattern, a photoalignment method has been developed. For example, alignment layers are formed on an upper substrate and a lower substrate, respectively, and a pretilt angle of the alignment layer on the upper substrate is different from that of the alignment layer on the lower substrate. When the two substrates are combined, a final alignment direction is determined from a vector sum of alignment directions of the alignment layers formed on the upper substrate and the lower substrate, respectively.

However, if a misalignment occurs between two substrates when they are combined, the final alignment direction determined from the vector sum may erroneous.

SUMMARY OF THE INVENTION

The present invention provides an alignment substrate, an LCD panel including the alignment substrate, and a method of manufacturing the alignment substrate.

Additional features of the invention will be set forth in the description which follows, and in part will be apparent from the description, or may be learned by practice of the invention.

The present invention discloses an alignment substrate that includes a base substrate and an alignment layer arranged on the base substrate. A plurality of unit pixels is defined in the base substrate. The alignment layer includes at least two sub-alignment portions dividing the unit pixel into at least two domains. Each sub-alignment portion arranged in a different domain of the at least two domains and is aligned to have a different pretilt direction from the other sub-alignment portions.

The present invention also discloses an LCD panel that includes a first substrate, a second substrate, and a liquid crystal layer interposed between the first substrate and the second substrate. The first substrate includes a first base substrate in which a plurality of unit pixels is defined, a pixel electrode arranged on the first base substrate, and a first alignment layer arranged on the pixel electrode. The first alignment layer includes at least two sub-alignment portions dividing the unit pixel into at least two domains. Each sub-alignment portion is arranged in a different domain of the at least two domains and is aligned to have a different pretilt direction from the other sub-alignment portions. The second substrate includes a second base substrate, and a common electrode arranged on the second base substrate.

The present invention also discloses a method of manufacturing an alignment substrate. The method includes forming a photoreactive layer on a base substrate in which a plurality of unit pixels is defined. An alignment layer is formed on the base substrate by irradiating light to the photoreactive layer. The alignment layer includes at least two sub-alignment portions dividing the unit pixel into at least two domains. Each sub-alignment portion is formed in a different domain of the at least two domains and is aligned to have a different pretilt direction from the other sub-alignment portions.

According to exemplary embodiments of the present invention, all sub-alignment portions of an alignment layer for forming a multi-domain structure are formed on one substrate, so that alignment direction errors may be prevented even though two substrates of an LCD panel are misaligned.

According to exemplary embodiments of the present invention, when a first substrate and a second substrate are combined to form the LCD panel, the alignment layer having the sub-alignment portions for forming the multi-domain structure is formed only on the first substrate. Thus, alignment direction errors of the alignment layer may be prevented even though the second substrate has no arrangement indicator for accurately arranging the two substrates.

According to exemplary embodiments of the present invention, a viewing angle of an LCD panel may be broadened. Further, when a dynamic capacitance compensation method is employed in accordance with the present invention, a response rate of liquid crystal molecules in the LCD panel may be increased.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
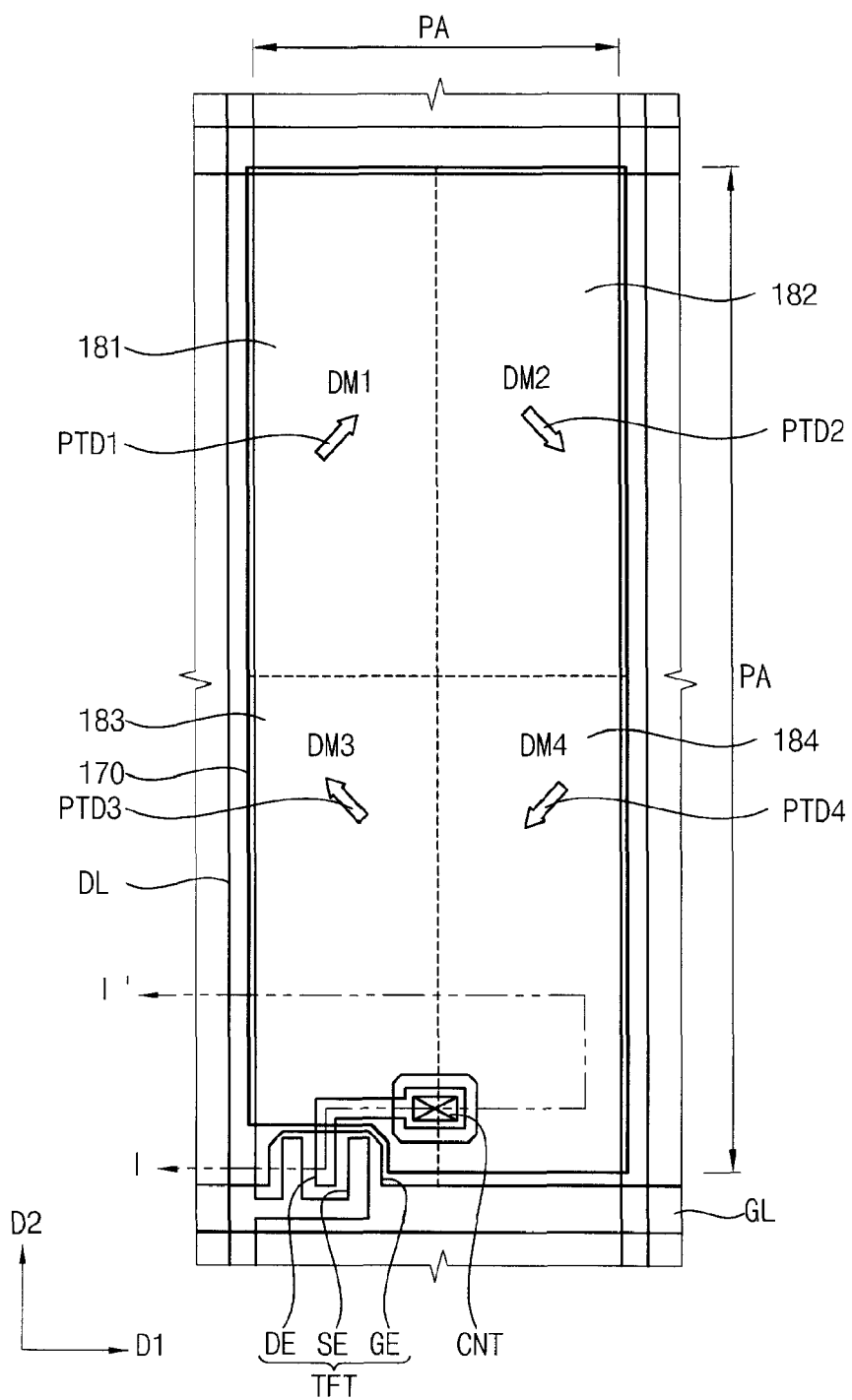
FIG. 1 is a plan view showing an LCD panel in accordance with an exemplary embodiment of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

The term "alignment layer" used in the specification and claims refers to a layer that aligns liquid crystal molecules to be previously tilted. The term "alignment substrate" refers to a substrate including the alignment layer. The term "pretilt" refers to a state in which a portion of the liquid crystal molecules is tilted so that the liquid crystal molecules may be tilted in a predetermined direction before an electric field is applied to a liquid crystal layer. The term "pretilt direction" refers to a direction in which the portion of the liquid crystal molecules is tilted before an electric field is applied to the liquid crystal layer.

Figure 2:
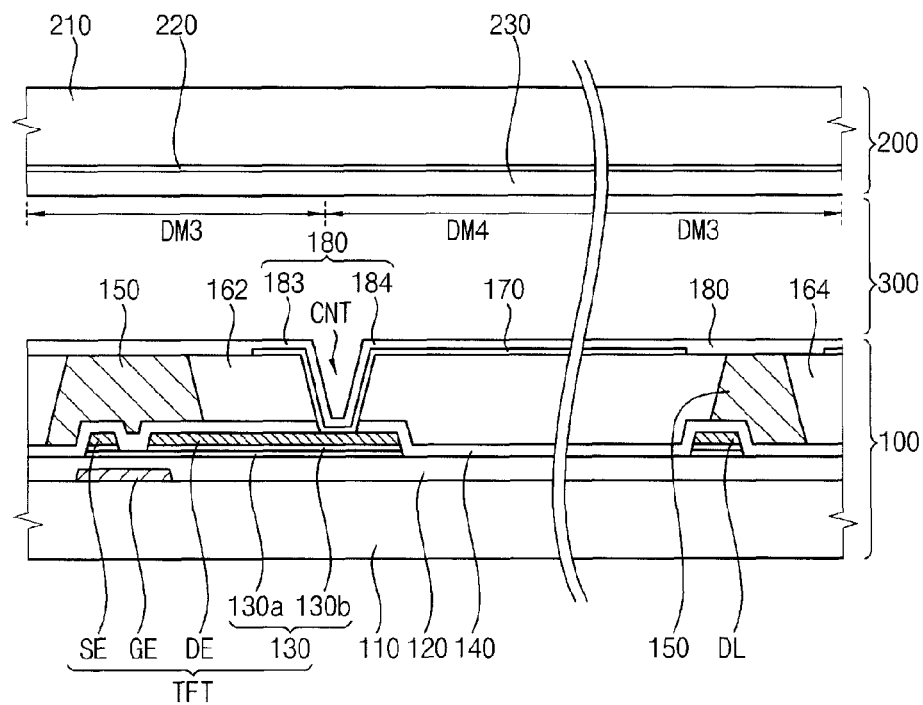
FIG. 2 is a cross-sectional view taken along line I-I' in FIG. 1.
Figure 3:
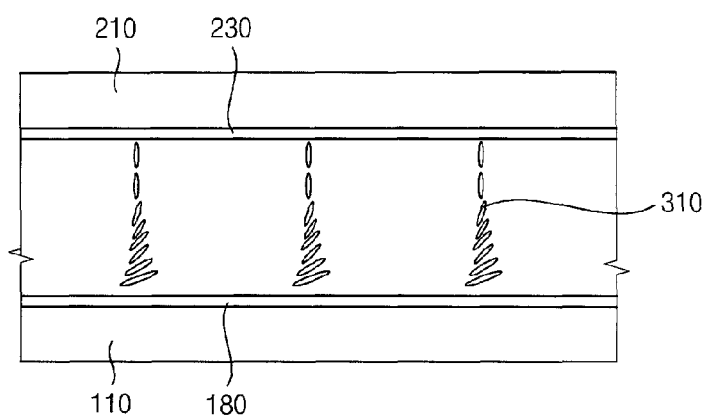
FIG. 3 is a cross-sectional view showing an arrangement of liquid crystal molecules of a liquid crystal layer shown in FIG. 2.

FIG. 1 is a plan view showing an LCD panel in accordance with an exemplary embodiment of the present invention. FIG. 2 is a cross-sectional view taken along line I-I' in FIG. 1. FIG. 3 is a cross-sectional view showing an arrangement of liquid crystal molecules of a liquid crystal layer shown in FIG. 2.

Referring to FIG. 1, FIG. 2, and FIG. 3, an LCD panel 500 in accordance with the present exemplary embodiment includes a first substrate 100, a second substrate 200 facing the first substrate 100, and a liquid crystal layer 300 interposed between the first substrate 100 and the second substrate 200.

In the present exemplary embodiment, the first substrate 100 may be a lower substrate including a thin-film transistor (TFT) and a pixel electrode 170. The second substrate 200 may be an upper substrate including a common electrode 220.

The first substrate 100 defines a plurality of unit pixels areas PA. The first substrate 100 includes a plurality of gate lines GL formed on a first base substrate 110, a plurality of data lines DL and the TFT. The gate lines GL may extend in a first direction D1 of the first base substrate 110. The gate lines GL may be arranged along a second direction D2 different from the first direction D1. The second direction D2 may be substantially perpendicular to the first direction D1. The data lines DL may extend in the second direction D2, and be arranged along the first direction D1.

Though not shown in FIG. 1 and FIG. 2, the first substrate 100 may further include a storage line formed on the first base substrate 110. The storage line may be formed with the same material as the gate line GL.

The first substrate 100 further includes a gate insulation layer 120 disposed on the gate line GL. The gate insulation layer 120 insulates the gate line GL from the data line DL.

The TFT may include a gate electrode GE connected to the gate line GL, a source electrode SE connected to the data line DL, a drain electrode DE separated from the source electrode SE, and an active pattern 130 formed on the gate insulation layer 120. The active pattern 130 includes a semiconductor layer 130a and an ohmic contact layer 130b formed on the semiconductor layer 130a. For example, the semiconductor layer 130a may comprise amorphous silicon, and the ohmic contact layer 130b may comprise n+ amorphous silicon that is doped with n-type impurities.

In the exemplary embodiment shown in FIG. 1, a single TFT is disposed in each unit pixel area PA, but at least two switching elements may be disposed in each unit pixel area PA.

The first substrate 100 may further include a passivation layer 140 that covers the data line DL, the source electrode SE and the drain electrode DE. The passivation layer 140 has a contact hole CNT exposing a portion of the drain electrode DE.

In the present exemplary embodiment, a light-blocking layer 150 and a plurality of color filters 162 and 164 may be formed on the first base substrate 110. That is, the first substrate 100 may further include the light-blocking layer 150 and the color filters 162 and 164.

The light-blocking layer 150 may be formed on the passivation layer 140 to overlap the gate electrode GE and the data line DL. The light-blocking layer 150 blocks light provided from a lower part of the first substrate 100, and prevents the light from being provided to the liquid crystal layer 300. The light-blocking layer 150 is formed on the first substrate 100 in FIG. 2, but the present invention is not limited to the position of the light-blocking layer 150 shown in the present exemplary embodiment. Alternatively, the light-blocking layer 150 may be formed on the second substrate 200.

The color filters 162 and 164 are formed on the passivation layer 140 in each pixel area PA. The color filters may include a first color filter 162, a second color filter 164, and a third color filter (not shown). The first color filter 162 and the second color filter 164 may display different colors. For example, the first color filter 162 may display a red color, and the second color filter 164 may display a blue color.

Though not shown in FIG. 2, the first color filter 162 may overlap the second color filter 164. For example, the first color filter 162 and the second color filter 164 may overlap over the gate line GL or over the data line DL. The first color filter 162 and the second color filter 164 may further overlap over a region where a first switching element and a second switching element are formed. Although the color filters 162 and 164 are formed on the first substrate 100 in FIG. 2, the present invention is not limited to this position. Alternatively, the first color filter 162 and the second color filter 164 may be formed on the second substrate 200.

The first substrate 100 further includes a pixel electrode 170 formed on the first color filter 162 and the second color filter 164. The pixel electrode 170 is a transparent electrode made of a transparent conductive material. Examples of the transparent conductive material include indium tin oxide (ITO), indium zinc oxide (IZO), aluminum-doped zinc oxide (AZO), etc.

The pixel electrode 170 is electrically connected to the TFT through the contact hole CNT. The contact hole CNT may be formed in the passivation layer 140 over the drain electrode DE and in the first color filter 162, to expose a portion of the drain electrode DE. Since the pixel electrode 170 is electrically connected to the TFT, the pixel electrode 170 may receive a pixel voltage applied through the TFT. For example, the pixel voltage applied through the data line DL is transmitted to the drain electrode DE in response to a gate voltage applied through the gate line GL, and the pixel voltage transmitted to the drain electrode DE is applied to the pixel electrode 170, which is electrically connected to the drain electrode DE through the contact hole CNT.

The second substrate 200 includes a second base substrate 210 and a common electrode 220 disposed on the second base substrate 210. The common electrode 220 is a transparent electrode including a transparent conductive material. Examples of the transparent conductive material include ITO, IZO, AZO, etc. The common electrode 220 receives a common voltage. The pixel electrode 170 and the common electrode 220 receive the pixel voltage and the common voltage, respectively, and generate an electric field to be applied to the liquid crystal layer 300.

The liquid crystal layer 300 is interposed between the first substrate 100 and the second substrate 200. The liquid crystal layer 300 includes a plurality of liquid crystal molecules. When an electric field is applied to the pixel electrode 170 and the common electrode 220, the arrangement of liquid crystal molecules in the liquid crystal layer 300 changes. The optical transmittance of the liquid crystal molecules is controlled by the changed arrangement of the liquid crystal molecules, to display an image having a grayscale.

The first substrate 100 further includes a first alignment layer 180 formed on the pixel electrode 170. In the present exemplary embodiment, the first alignment layer 180 includes at least two sub-alignment portions in each unit pixel PA, and each sub-alignment portion is photoaligned to have a different pretilt direction from the other sub-alignment portions.

For example, as shown in FIG. 1, the unit pixel PA is divided into four domains. The four domains include a first domain DM1 disposed at the upper left, a second domain DM2 disposed at the upper right, a third domain DM3 disposed at the lower left, and a fourth domain DM4 disposed at the lower right.

The first alignment layer 180 includes four sub-alignment portions 181, 182, 183, and 184 corresponding to the four domains DM1, DM2, DM3, and DM4, respectively. For example, the first alignment layer 180 includes a first sub-alignment portion 181 corresponding to the first domain DM1, a second sub-alignment portion 182 corresponding to the second domain DM2, a third sub-alignment portion 183 corresponding to the third domain DM3, and a fourth sub-alignment portion 184 corresponding to the fourth domain DM4.

The first to fourth sub-alignment portions 181, 182, 183, and 184 of the first alignment layer 180 have different pretilt directions. That is, the first sub-alignment portion 181 has a first pretilt direction PTD1, and the second sub-alignment portion 182 has a second pretilt direction PTD2. The third sub-alignment portion 183 has a third pretilt direction PTD3, and the fourth sub-alignment portion 184 has a fourth pretilt direction PTD4.

The term "pretilt" refers to a state in which a portion of the liquid crystal molecules 310 are tilted so that the liquid crystal molecules 310 may be tilted in a predetermined direction before an electric field is applied to a liquid crystal layer 300. The term "pretilt direction" refers to a direction in which the portion of the liquid crystal molecules 310 are tilted before the electric field is applied to the liquid crystal layer 300. When the first to fourth sub-alignment portions 181, 182, 183, and 184 have respective pretilt directions, the liquid crystal molecules 310 on the first alignment layer 180, particularly, directors of the liquid crystal molecules 310 that are adjacent to the first alignment layer 180, may be aligned substantially parallel with the pretilt directions.

When the unit pixel PA is divided into at least two domains and the first alignment layer 180 includes the sub-alignment portions 181, 182, 183, and 184 corresponding to each domain, a viewing angle of the LCD panel 500 may be wide compared to when a unit pixel PA has a single domain.

In the present exemplary embodiment, all of at least two sub-alignment portions for forming a multi-domain structure in the unit pixel PA, for example, the four sub-alignment portions 181, 182, 183, and 184, are formed on the first substrate 100. Accordingly, even though the first substrate 100 and the second substrate 200 may be misaligned in a combining process, pretilt direction errors that are determined by the first to fourth sub-alignment portions 181, 182, 183, and 184 may not occur.

When alignment layers are formed on an upper substrate and a lower substrate, respectively, and the final pretilt direction is determined from a vector sum of a pretilt direction of the alignment layer formed on the upper substrate and a pretilt direction of the alignment layer formed on the lower substrate, the final pretilt direction determined from the vector sum may be in error if the upper substrate and the lower substrate are misaligned. If the light-blocking layer 150 is disposed on the second substrate 200, the light-blocking layer 150 may function as an indicator for accurately arranging the two substrates when combining the two substrates. However, as shown in FIG. 2, when the light-blocking layer 150 is not disposed on the second substrate 200 but is disposed on the first substrate 100, the second substrate 200 has no indicator for accurately arranging the two substrates, and thus a possibility that the two substrates are misaligned may further increase.

However, according to exemplary embodiments of the present invention, since all of at least two sub-alignment portions, for example, the four sub-alignment portions 181, 182, 183, and 184 are formed on the first substrate 100, the possibility that pretilt direction errors occur may be eliminated, even though the first substrate 100 and the second substrate 200 are misaligned in combining process.

The first to fourth sub-alignment portions 181, 182, 183, and 184 of the first alignment layer 180 may be formed by a photoalignment process so that the first to fourth sub-alignment portions 181, 182, 183, and 184 have respective pretilt directions PTD1, PTD2, PTD3, and PTD4. The photoalignment process will be described in detail with reference to FIG. 5A, FIG. 5B, FIG. 5C, and FIG. 5D.

In the present exemplary embodiment, the first to fourth pretilt directions PTD1, PTD2, PTD3, and PTD4 of the first to fourth sub-alignment portions 181, 182, 183, and 184 may rotate clockwise. For example, pretilt directions of sub-alignment portions bordering on each other may be substantially perpendicular to each other, and pretilt directions of diagonally situated sub-alignment portions may differ by about 180 degrees. For example, the first pretilt direction PTD1 may be directed toward a counterclockwise direction of 45 degrees with respect to the first direction D1, and the second pretilt direction PTD2 may be directed toward a clockwise direction of 45 degrees with respect to the first direction D1. The third pretilt direction PTD3 may be directed toward a counterclockwise direction of 135 degrees with respect to the first direction D1, and the fourth pretilt direction PTD4 may be directed toward a clockwise direction of 135 degrees with respect to the first direction D1. However, the present invention is not limited to the above-mentioned pretilt directions. That is, the pretilt directions PTD1, PTD2, PTD3, and PTD4 of the first to fourth sub-alignment portions 181, 182, 183, and 184 may be different from the pretilt directions in the present exemplary embodiment. For example, the first to fourth pretilt directions PTD1, PTD2, PTD3, and PTD4 of the first to fourth sub-alignment portions 181, 182, 183, and 184 may rotate counterclockwise. Alternatively, the first pretilt direction PTD1 of the first sub-alignment portion 181 and the fourth pretilt direction PTD4 of the fourth sub-alignment portion 184 may converge on a center portion of the unit pixel area PA, and the second pretilt direction PTD2 of the second sub-alignment portion 182 and the third pretilt direction PTD3 of the third sub-alignment portion 183 may diverge from the center portion of the unit pixel area PA.

The second substrate 200 may further include a second alignment layer 230 formed on the common electrode 220. Since the first alignment layer 180 formed on the first substrate 100 includes at least two sub-alignment portions, for example, four sub-alignment portions 181, 182, 183, and 184, and thus multiple domains DM1, DM2, DM3, and DM4 corresponding to the 181, 182, 183 and 184 are formed in the unit pixel area PA, the second alignment layer 230 formed on the second substrate 200 does not require sub-alignment portions. In the present exemplary embodiment, the second alignment layer 230 may have a vertical alignment direction. The second alignment layer 230 may be photoaligned to have the vertical alignment direction, or may be formed by other methods than the photoalignment method.

FIG. 3 shows the liquid crystal molecules 310 arranged in an LCD panel operating in a vertical alignment mode when the second alignment layer 230 has a vertical alignment direction. The liquid crystal molecules 310 adjacent to the first alignment layer 180 on the first substrate 110 may be tilted to be substantially parallel with the pretilt directions PTD1, PTD2, PTD3, and PTD4 of the first to fourth sub-alignment portions 181, 182, 183, and 184, and the liquid crystal molecules 310 adjacent to the second alignment layer 230 may be aligned to be substantially perpendicular to the second alignment layer 230.

Alternatively, the second substrate 200 may not have an alignment layer, for example, when the LCD panel operates in an in-plane switching (IPS) mode.

Figure 4A:
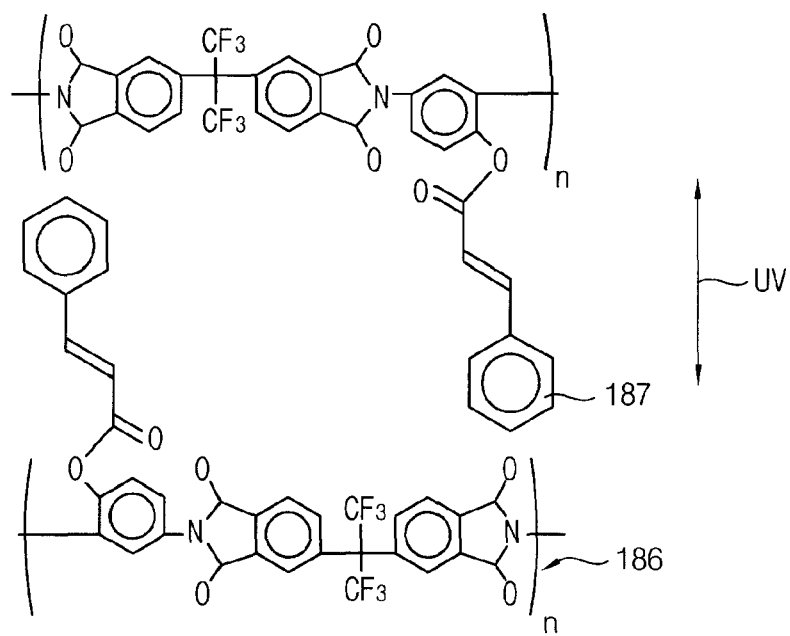
FIG. 4A shows an exemplary chemical formula of a photoreactive polymer for forming the first alignment layer shown in FIG. 2.
Figure 4B:
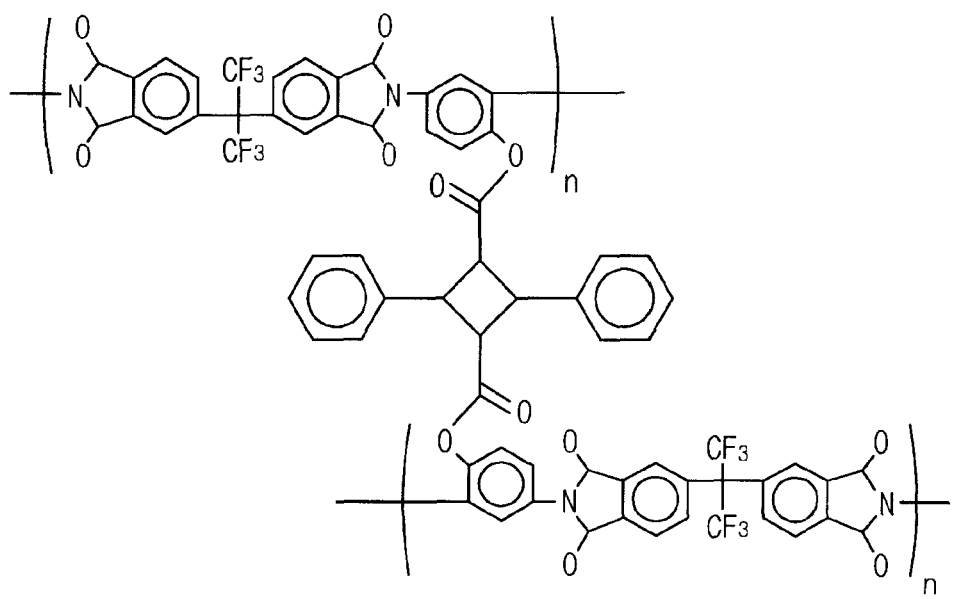
FIG. 4B shows an exemplary chemical formula of an alignment material after the photoreactive polymer shown in FIG. 4A is photoaligned by a photoalignment process.

FIG. 4A shows an exemplary chemical formula of a photoreactive polymer for forming the first alignment layer shown in FIG. 2. FIG. 4B shows an exemplary chemical formula of an alignment material after the photoreactive polymer shown in FIG. 4A is photoaligned by a photoalignment process.

Referring to FIG. 4A and FIG. 4B, an alignment material for forming an alignment layer in accordance with the present exemplary embodiment may include a photoreactive polymer. For example, the alignment material includes polyimide main chains 186 and side chains 187 connected to the polyimide main chains 186. The side chains 187 may have a double bond that makes the side chains 187 have directionality. The directionality of an alignment material means that molecules of the alignment material are directed to or have a tendency to be directed to a predetermined direction.

When ultraviolet (UV) light polarized in a predetermined direction is irradiated to the photoreactive polymer aligned in random directions, optical reactors having directionality perpendicular to or parallel with the polarized direction of the polarized UV light are photopolymerized. For example, when UV light having a polarization axis is irradiated to the side chains 187, the side chains 187 are photopolymerized to have structural anisotropy, and thus the photoreactive polymer obtains a pretilt direction tilted to the irradiating direction of the UV light.

Since the photopolymerized photoreactive polymer has the pretilt direction, a director of liquid crystal molecules may be aligned in a direction substantially parallel with the pretilt direction of the photoreactive polymer when the liquid crystal molecules are disposed on the alignment layer.

The angle at which the side chains 187 are tilted is exaggerated in FIG. 4A and FIG. 4B, but it is known that actual side chains are tilted at several degrees from a normal line of the alignment layer by the photoalignment process.

In FIG. 4A and FIG. 4B, polyimide is used as an example of the alignment material, but the alignment material according to the present invention is not limited to polyimide. The alignment material may include polyamic acid, polynorbornene, phenylmaleimide copolymer, polyvinyl cinnamate, polyazobenzene, polyethyleneimine, polyvinyl alcohol, polyamide, polyethylene, polystyrene, polyphenylene phthalamide, polyester, polyurethane, polymethyl methacrylate, etc.

Further, the alignment material used in the aligning process is not limited to the photoreactive polymer. The alignment layer may be formed by an aligning process in which an ion beam is irradiated to an inorganic material such as silicon oxide (SiOx).

FIG. 5A, FIG. 5B, FIG. 5C, and FIG. 5D are perspective views showing exemplary processes of forming the first alignment layer shown in FIG. 2.

In the present exemplary embodiment of a photoalignment process described with reference to FIG. 5A, FIG. 5B, FIG. 5C, and FIG. 5D, it is assumed that a photoreactive polymer layer is deposited on the first substrate 100 and polarized UV light is used as light for photoaligning the photoreactive polymer layer. Further, it is assumed that the molecules of the photoreactive polymer layer have directionality toward a direction in which the polarized UV light is irradiated. In another exemplary embodiment of the photoalignment process, the molecules of the photoreactive polymer layer may have directionality opposite to a direction in which the polarized UV light is irradiated. Further, in another exemplary embodiment of the photoalignment process, an ion beam of other light that is not the UV light may be used.

Hereinafter, the first direction D1 may be named "right direction" and a direction opposite to the first direction D1 may be named "left direction" in a plane including the first direction D1 and the second direction D2. Further, the second direction D2 may be named "upper direction" and a direction opposite to the second direction D2 may be named "lower direction" in the plane including the first direction D1 and the second direction D2.

Figure 5A:
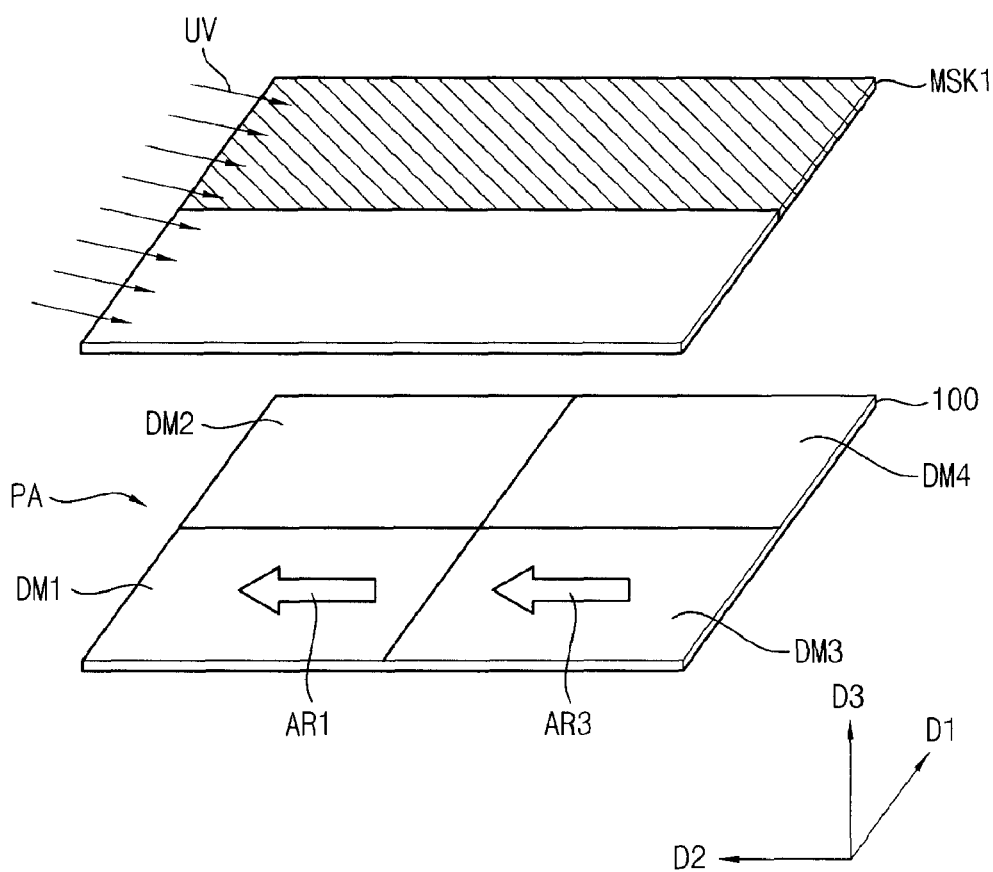
FIG. 5A, FIG. 5B, FIG. 5C, and FIG. 5D are perspective views showing exemplary processes of forming the first alignment layer shown in FIG. 2.

Referring to FIG. 5A, a photoreactive polymer layer is formed on the first substrate 100. A mask is disposed over the first substrate 100 in which the photoreactive polymer layer is formed, and the photoreactive polymer layer is exposed to light, for example, the polarized UV light. That is, a light-exposure process takes place.

In the present exemplary embodiment, when each unit pixel is divided into at least two domains along the first direction D1, one of the divided domains is exposed to the light, and the other domains are blocked from the light. The exposed domain may be selected successively along the first direction D1.

As shown in FIG. 5A, a first mask MSK1 is disposed over the first substrate 100 on which the photoreactive polymer layer is formed, and a first light-exposure process takes place.

For example, a left half of the first mask MSK1 transmits the UV light, and a right half of the first mask MSK1 blocks the UV light. Accordingly, the UV light is irradiated to a first domain DM1 and a third domain DM3 that are disposed at a left side of the unit pixel area PA, and is not irradiated to a second domain DM2 and a fourth domain DM4 that are disposed at a right side of the unit pixel area PA.

The UV light proceeds toward a lower direction (i.e., a direction opposite to the second direction D2) from a plane in which the first mask MSK1 is disposed. Further, the UV light is irradiated with respected to the first substrate 100. That is, the UV light is irradiated at a predetermined angle in a third direction D3 with respect to the plane in which the first mask MSK1 is disposed. The third direction D3 is substantially perpendicular to each of the first direction D1 and the second direction D2. The oblique angle of the UV light in the third direction D3 may be substantially equal to a pretilt angle of the first alignment layer (180 in FIG. 2) with respect to the first substrate 100. The pretilt angle is defined as an angle at which liquid crystal molecules adjacent to the first alignment layer are tilted with respect to the first substrate 100, when the liquid crystal molecules are disposed on the first alignment layer.

Directions of arrows AR1 and AR3 shown in FIG. 5A represent two dimensional alignment directions in which the photoreactive polymer layers formed in each of the domains DM1 and DM3 are photoaligned by the UV light. That is, the photoreactive polymer layers formed in the first domain DM1 and the third domain DM3, to which the UV light is irradiated, react to the UV light. Thus, the photoreactive polymer layers formed in the first domain DM1 and the third domain DM3 are photoaligned in an upper direction (i.e., the second direction D2) in which the UV light is irradiated. The photoreactive polymer layers formed in the second domain DM2 and the fourth domain DM4, to which the UV light is not irradiated, are not photoaligned.

Figure 5B:
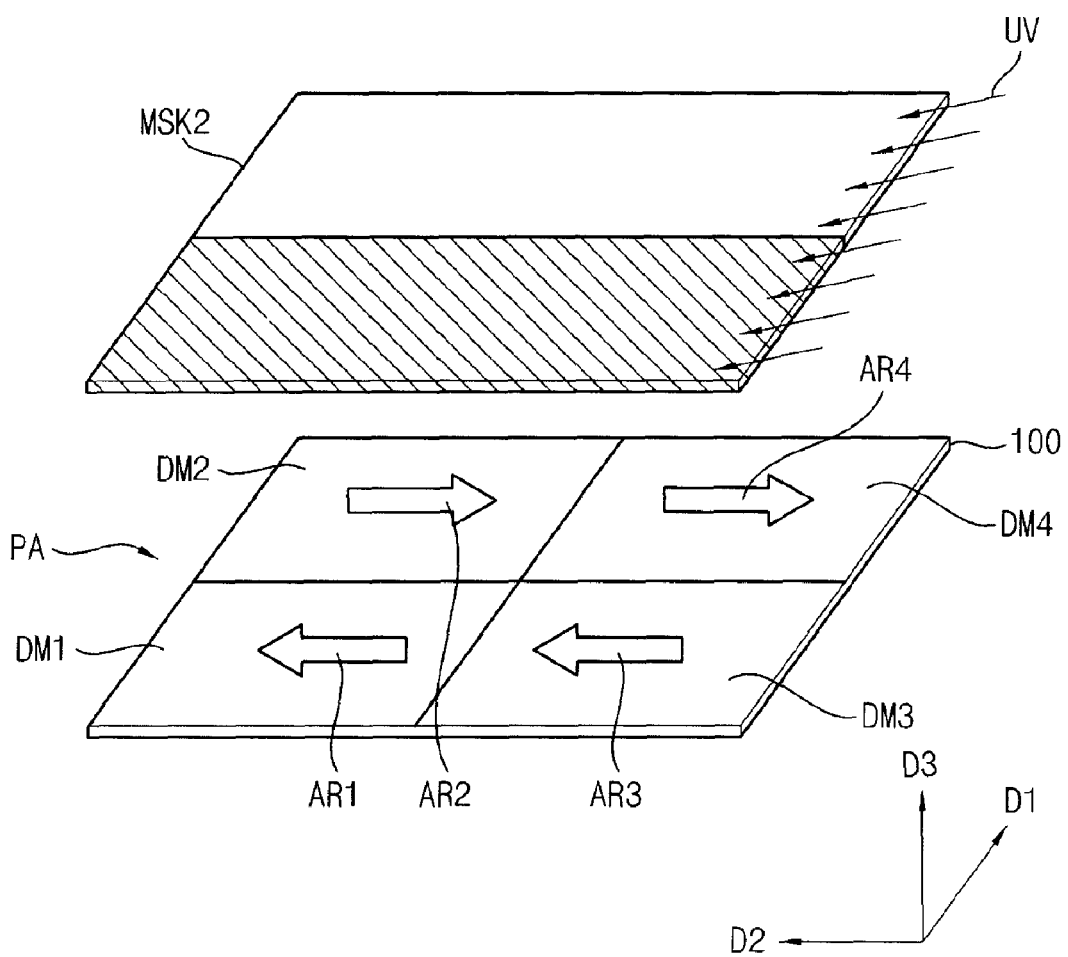

Referring to FIG. 5B, a second mask MSK2 is disposed over the first substrate 100 on which the photoreactive polymer layer is formed, and a second light-exposure process takes place.

For example, a left half of the second mask MSK2 blocks the UV light, and a right half of the second mask MSK2 transmits the UV light. Accordingly, the UV light is not irradiated to the first domain DM1 and the third domain DM3 that are disposed at the left side of the unit pixel area PA, and the UV light is irradiated to the second domain DM2 and the fourth domain DM4 that are disposed at the right side of the unit pixel area PA.

The UV light proceeds toward the upper direction (i.e., the second direction D2) from a plane in which the second mask MSK2 is disposed. That is, the UV light is irradiated at a predetermined angle in the third direction D3 with respect to the plane in which the second mask MSK2 is disposed. As mentioned above, the oblique angle of the UV light in the third direction D3 may be substantially equal to the pretilt angle of the first alignment layer (180 in FIG. 2) with respect to the first substrate 100.

Directions of arrows AR1, AR2, AR3, and AR4 shown in FIG. 5B represent two dimensional alignment directions in which the photoreactive polymer layers formed in each of the domains DM1, DM2, DM3, and DM4 are photoaligned by the UV light. That is, the photoreactive polymer layers formed in the second domain DM2 and the fourth domain DM4, to which the UV light is irradiated, react to the UV light. Thus, the photoreactive polymer layers formed in the second domain DM2 and the fourth domain DM4 are photoaligned in the lower direction (i.e., a direction opposite to the second direction D2) in which the UV light is irradiated. The photoalignment directions of the photoreactive polymer layers formed in the first domain DM1 and the third domain DM3, to which the UV light is not irradiated, are not changed and still directed toward the second direction D2.

Figure 5C:
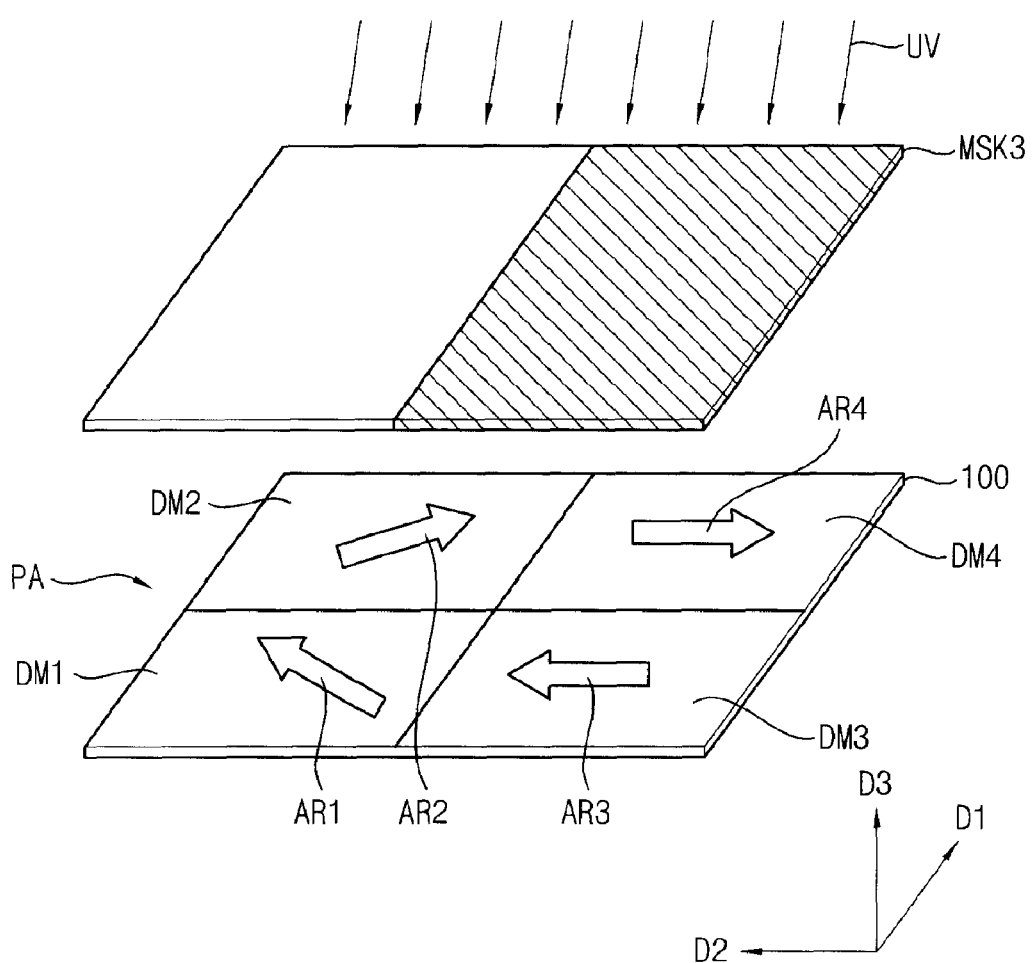

Referring to FIG. 5C, in another exemplary embodiment, when each unit pixel is divided into at least two domains along the second direction D2, one of the divided domains is exposed to the light, and the other domains are blocked from the light. The exposed domain may be selected successively along the second direction D2.

As shown in FIG. 5C, a third mask MSK3 is disposed over the first substrate 100 in which the photoreactive polymer layer is formed, and a third light-exposure process takes place.

For example, an upper half of the third mask MSK3 transmits the UV light, and a lower half of the third mask MSK3 blocks the UV light. Accordingly, the UV light is irradiated to the first domain DM1 and the second domain DM2 that are disposed at an upper side of the unit pixel area PA, and the UV light is not irradiated to the third domain DM3 and the fourth domain DM4 that are disposed at a lower side of the unit pixel area PA.

The UV light proceeds toward the left direction (i.e., a direction opposite to the first direction D1) from the plane in which the third mask MSK3 is disposed. Further, the UV light is irradiated at a predetermined angle in the third direction D3 with respect to the plane in which the third mask MSK3 is disposed. As mentioned above, the oblique angle of the UV light in the third direction D3 may be substantially equal to the pretilt angle of the first alignment layer (180 in FIG. 2) with respect to the first substrate 100.

Directions of arrows AR1, AR2, AR3, and AR4 shown in FIG. 5C represent two dimensional alignment directions in which the photoreactive polymer layers formed in each of the domains DM1, DM2, DM3, and DM4 are photoaligned by the UV light. That is, the photoreactive polymer layer formed in the first domain DM1 to which the UV light is irradiated is photoaligned in a direction of a vector sum of the upper direction (i.e., the second direction D2) that is the alignment direction of the first domain DM1 caused by the first light-exposure process and the right direction (i.e., the first direction D1) that is the alignment direction of the first domain DM1 caused by the third light-exposure process. The direction of the vector sum of the upper direction and the right direction is rotated counterclockwise at about 45 degrees with respect to the first direction D1 in the plane of the first substrate 100.

Similarly, the photoreactive polymer layer formed in the second domain DM2 to which the UV light is irradiated is photoaligned in a direction of a vector sum of the lower direction (i.e., the direction opposite to the second direction D2) that is the alignment direction of the second domain DM2 caused by the second light-exposure process and the right direction (i.e., the first direction D1) that is the alignment direction of the second domain DM2 caused by the third light-exposure process. The direction of the vector sum of the lower direction and the right direction is rotated clockwise at about 45 degrees with respect to the first direction D1 in the plane of the first substrate 100.

The photoalignment directions of the photoreactive polymer layers formed in the third domain DM3 and the fourth domain DM4, to which the UV light is not irradiated, are not changed. That is, the photoalignment direction of the photoreactive polymer layer formed in the third domain DM3 is the upper direction (i.e., the second direction D2) that is the alignment direction of the third domain DM3 caused by the first light-exposure process. The photoalignment direction of the photoreactive polymer layer formed in the fourth domain DM4 is the lower direction (i.e., the direction opposite to the second direction D2) that is the alignment direction of the fourth domain DM4 caused by the second light-exposure process.

Figure 5D:
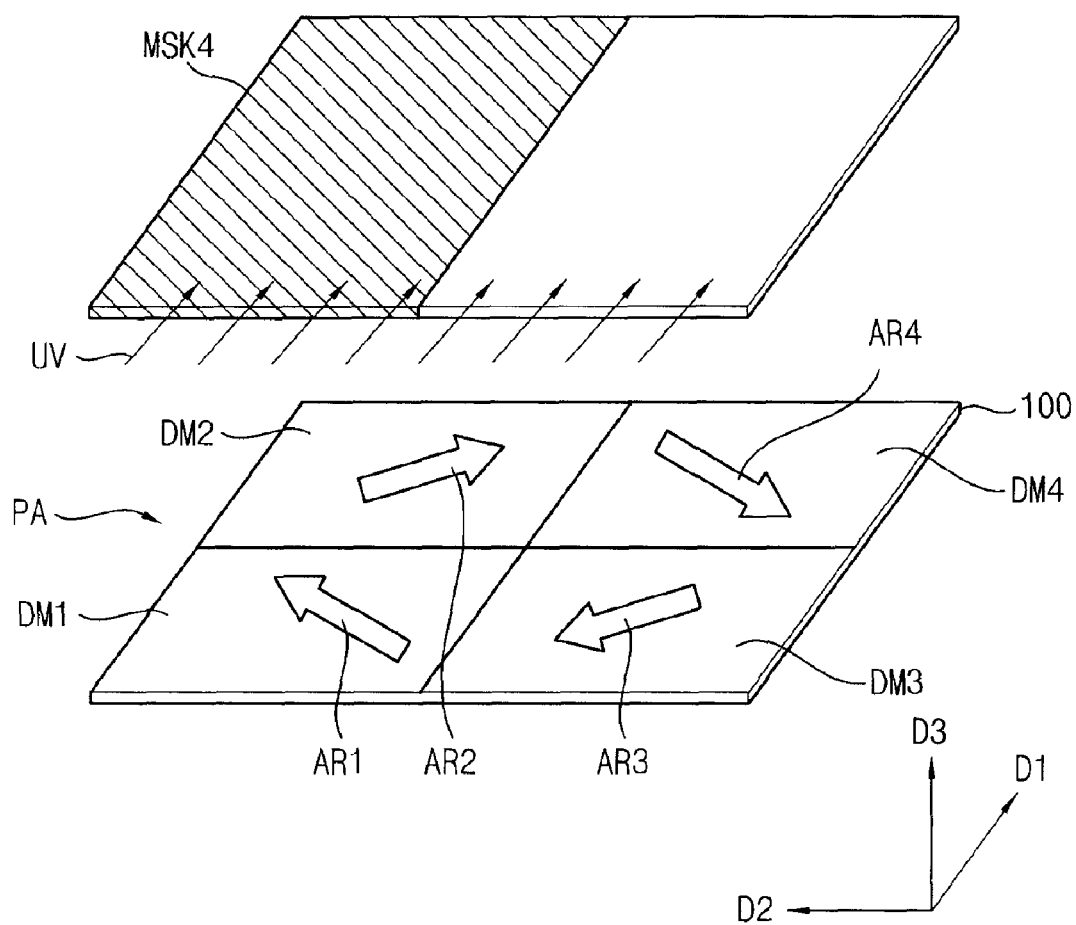

Referring to FIG. 5D, a fourth mask MSK4 is disposed over the first substrate 100 on which the photoreactive polymer layer is formed, and a fourth light-exposure process proceeds.

For example, an upper half of the fourth mask MSK4 blocks the UV light, and a lower half of the fourth mask MSK4 transmits the UV light. Accordingly, the UV light is irradiated to the third domain DM3 and the fourth domain DM4 that are disposed at a lower side of the unit pixel area PA, and is not irradiated to the first domain DM1 and the second domain DM2 that are disposed at an upper side of the unit pixel area PA.

The UV light proceeds toward the right direction (i.e., the first direction D1) from the plane in which the fourth mask MSK4 is disposed. Further, in three dimensional coordinates, the UV light is irradiated at a predetermined angle in the third direction D3 with respect to the plane in which the fourth mask MSK4 is disposed. As mentioned above, the oblique angle of the UV light in the third direction D3 may be substantially equal to the pretilt angle of the first alignment layer (180 in FIG. 2) with respect to the first substrate 100.

Directions of arrows AR1, AR2, AR3, and AR4 shown in FIG. 5D represent two dimensional alignment directions in which the photoreactive polymer layers formed in each of the domains DM1, DM2, DM3, and DM4 are photoaligned by the UV light. That is, the photoreactive polymer layer formed in the third domain DM3 to which the UV light is irradiated is photoaligned in a direction of a vector sum of the upper direction (i.e., the second direction D2) that is the alignment direction of the third domain DM3 caused by the first light-exposure process and the left direction (i.e., the direction opposite to the first direction D1) that is the alignment direction of the third domain DM3 caused by the fourth light-exposure process. The direction of the vector sum of the upper direction and the left direction is rotated counterclockwise at about 135 degrees with respect to the first direction D1 in the plane of the first substrate 100.

Similarly, the photoreactive polymer layer formed in the fourth domain DM4 to which the UV light is irradiated is photoaligned in a direction of a vector sum of the lower direction (i.e., the direction opposite to the second direction D2) that is the alignment direction of the fourth domain DM4 caused by the second light-exposure process and the left direction (i.e., the direction opposite to the first direction D1) that is the alignment direction of the fourth domain DM4 caused by the fourth light-exposure process. The direction of the vector sum of the lower direction and the left direction is rotated clockwise at about 135 degrees with respect to the first direction D1 in the plane of the first substrate 100. The photoalignment directions of the photoreactive polymer layers formed in the first domain DM1 and the second domain DM2, to which the UV light is not irradiated, are not changed.

As a result, the directions of arrows AR1, AR2, AR3, and AR4 shown in FIG. 5D represent pretilt directions of the first to fourth sub-alignment portions (181, 182, 183, and 184 in FIG. 1) corresponding to the first to fourth domains DM1, DM2, DM3, and DM4, respectively, which are formed through the first to fourth light-exposure processes. For example, the direction of the arrow AR1 in the first domain DM1 is substantially equal to the first pretilt direction PTD1 of the first sub-alignment portion 181 shown in FIG. 1, and the direction of the arrow AR2 in the second domain DM2 is substantially equal to the second pretilt direction PTD2 of the second sub-alignment portion 182 shown in FIG. 1. The direction of the arrow AR3 in the third domain DM3 is substantially equal to the third pretilt direction PTD3 of the third sub-alignment portion 183 shown in FIG. 1, and the direction of the arrow AR4 in the fourth domain DM4 is substantially equal to the fourth pretilt direction PTD4 of the fourth sub-alignment portion 184 shown in FIG. 1.

Referring back to FIG. 5A, FIG. 5B, FIG. 5C, and FIG. 5D, when a first light is defined as light that is irradiated to the domain selected from the at least two domains divided along the first direction D1, and a second light is defined as light that is irradiated to the domain selected from the at least two domains divided along the second direction D2, an energy of the first light (i.e., a first optical energy) may be larger than an energy of the second light (i.e., a second optical energy).

The ratio of the first optical energy to the second optical energy may be adjusted so that the first to fourth pretilt directions PTD1, PTD2, PTD3, and PTD4 are tilted at about 45 degrees with respect to the first direction D1 or the second direction D2. For example, when the first optical energy is about 160 mJ/cm$^2$, the second optical energy may be about 40 mJ/cm$^2$. When the first optical energy is about 40 mJ/cm$^2$, the second optical energy may be about 20 mJ/cm$^2$. Alternately, when the first optical energy is about 1000 mJ/cm$^2$, the second optical energy may be about 100 mJ/cm$^2$. However, the optical energy is not limited to the above-mentioned numerical values, but may be optimized according to photoreactive materials or kinds of the light.

According to the method of manufacturing an alignment substrate described above, at least two sub-alignment portions, for example, all the four sub-alignment portions 181, 182, 183, and 184 are formed on the first substrate 100. Therefore, pretilt direction errors of the first alignment layer 180 may not occur, even though the first substrate 100 and the second substrate 200 are misaligned when they are combined.

The photoalignment processes described with reference to FIG. 5A, FIG. 5B, FIG. 5C, and FIG. 5D is merely one exemplary embodiment of the present invention, and the present invention is not limited to the exemplary embodiment described above. That is, the sequence order of the first to fourth light-exposure processes may be exchanged, and the direction in which the UV light is irradiated may be changed.

Further, in the exemplary embodiment described above, the UV light is irradiated to the substrate in a vertical direction or a horizontal direction, and each pretilt direction of the sub-alignment portions 181, 182, 183, and 184 is determined by a vector sum of the vertical pretilt direction and the horizontal pretilt direction that are caused by a separate light-exposure processes. However, the present invention is not limited to the above mentioned method. In another exemplary embodiment, UV light-irradiating equipment capable of irradiating the UV light in a diagonal direction of a substrate may be used. That is, the UV light may be irradiated to the sub-alignment portions 181, 182, 183, and 184 in directions corresponding to the pretilt directions thereof, so that the pretilt directions (i.e., diagonal directions of the substrate) of the sub-alignment portions 181, 182, 183, and 184 may be directly determined regardless of the vector sum.

Figure 6:
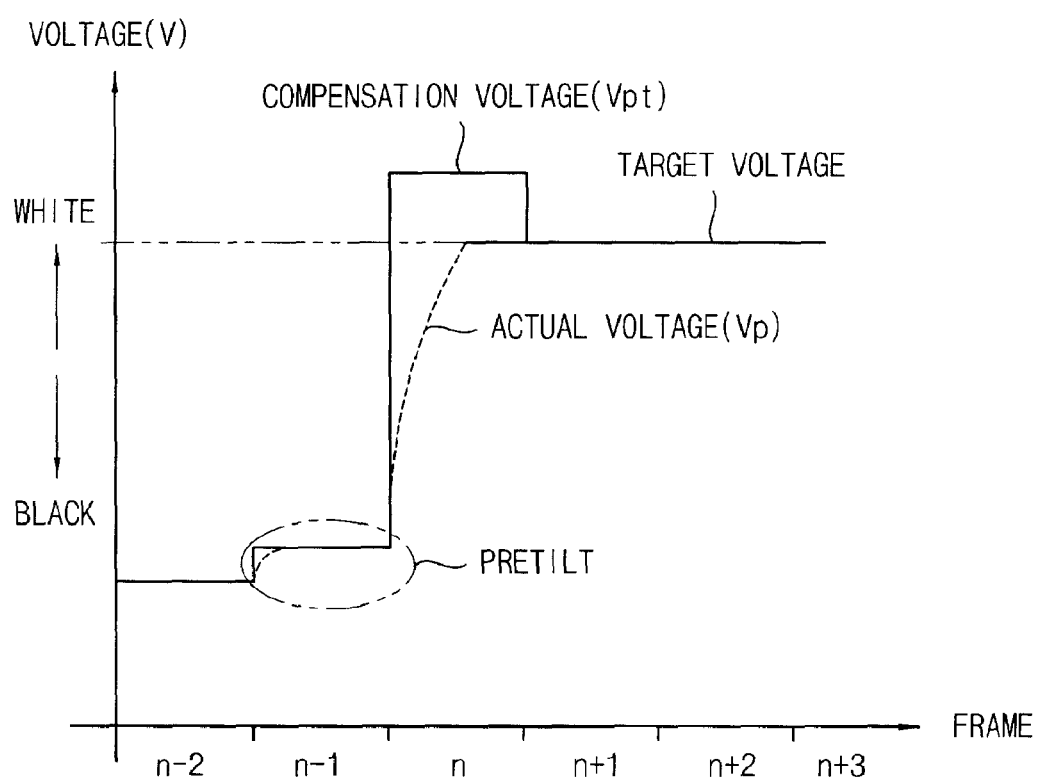
FIG. 6 is a graph for describing a response time of liquid crystal molecules of the LCD panel shown in FIG. 2.

FIG. 6 is a graph showing a response time of liquid crystal molecules of the LCD panel 500 shown in FIG. 2.

The response time of the liquid crystal molecules is defined as a time during which the liquid crystal molecules are rearranged when an electric field is applied to the liquid crystal layer 300.

In the LCD panel 500 described with reference to FIG. 1, FIG. 2, and FIG. 3, as described above, at least two sub-alignment portions, for example, all four sub-alignment portions 181, 182, 183, and 184, are formed on the first substrate 100. Meanwhile, the second substrate 200 includes the second alignment layer 230 that is vertically aligned, or does not include an alignment layer.

When all the sub-alignment portions 181, 182, 183, and 184 are formed on one substrate, liquid crystal molecules adjacent the other substrate on which the sub-alignment portions are not formed are not pretilted and thus are vertically aligned. When the liquid crystal molecules are not pretilted, though not inevitable, the response time of the liquid crystal molecules may be relatively slow. Therefore, an additional method for improving the response time of the liquid crystal molecules may be used in applications of the present invention.

In the present exemplary embodiment, a dynamic capacitance compensation (DCC) method may be used to improve the response time of the liquid crystal molecules. The DCC method means a method in that a voltage having a higher level than a target voltage level is applied to the liquid crystal layer during one frame to forcefully pretilt the liquid crystal molecules when a gray scale is changed (for example, when the gray scale is changed from black to white). The voltage having the higher level than the target voltage is named a pretilt voltage. When the pretilt voltage is applied to the liquid crystal layer, the liquid crystal molecules are not only pretilted by the alignment layer, but also pretilted by the pretilt voltage. Accordingly, the response time, at which the liquid crystal molecules are rearranged, may be improved.

Referring to FIG. 6, a compensation voltage Vpt is applied to the liquid crystal layer so that a pixel voltage Vp of the present frame may quickly reach a target voltage. The compensation voltage Vpt may be determined according to the target voltage of the present frame, a pixel voltage of a previous frame, and a pixel voltage of a next frame. The compensation voltage Vpt may be the pretilt voltage.

When the gray scale is changed from black to white, a higher voltage than that in the black gray scale is applied to the liquid crystal layer during one frame before the frame in which the gray scale is changed from black to white, so that the liquid crystal molecules may be pretilted. In the present exemplary embodiment, the compensation voltage Vpt may be appropriately determined from a look-up table.

As described above, the DCC method is employed in the LCD panel 500 including the alignment substrate in accordance with the present invention, so that the response time of the liquid crystal molecules may be further improved.

Figure 7:
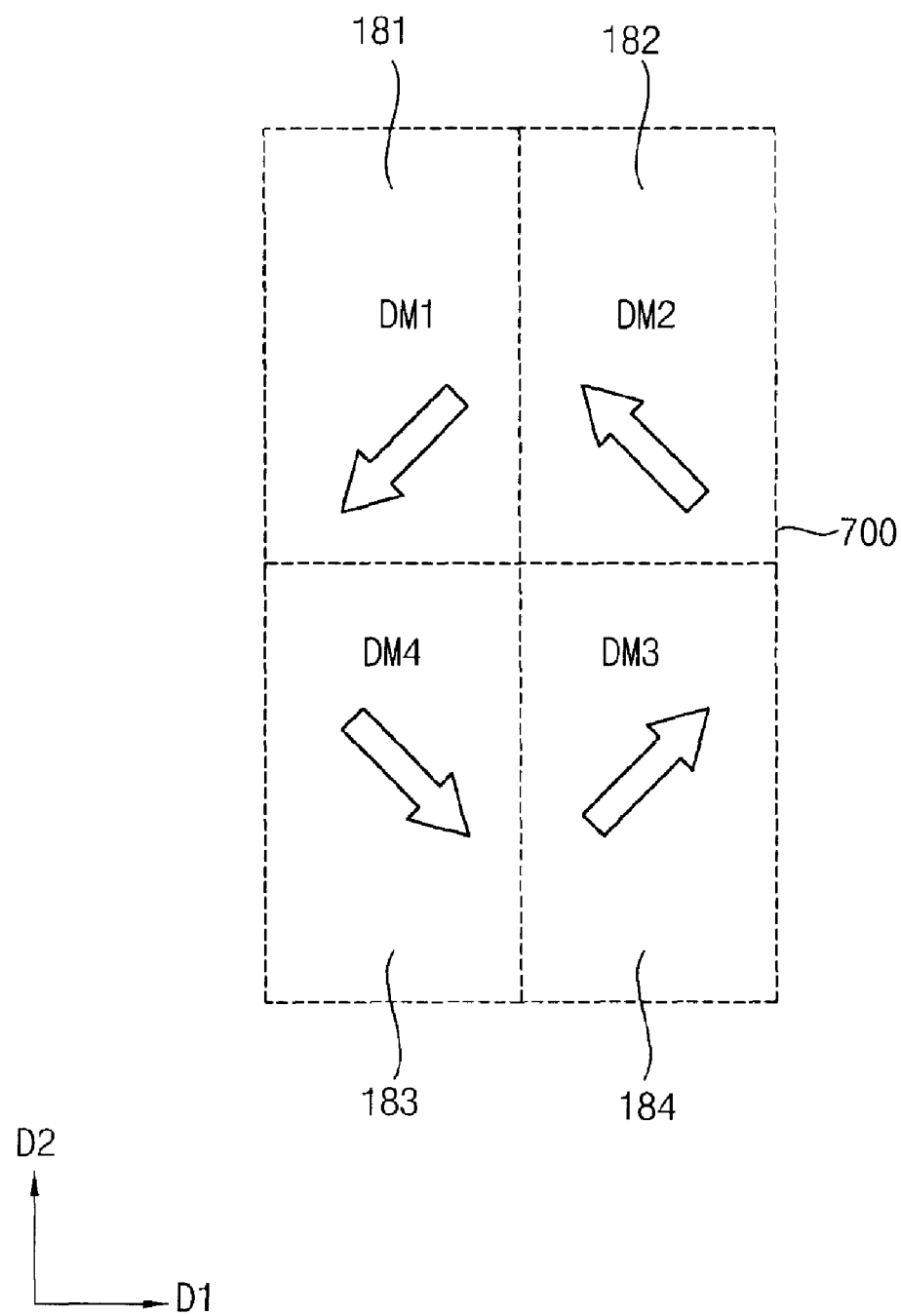
FIG. 7 is a plan view showing an LCD panel in accordance with an exemplary embodiment of the present invention.

FIG. 7 is a plan view showing an LCD panel in accordance with another exemplary embodiment.

The alignment substrate 700 described with reference to FIG. 7 may be substantially the same as the first substrate 100 described with reference to FIG. 1 and FIG. 2 except for pretilt directions of sub-alignment portions corresponding to the domains DM1, DM2, DM3, and DM4. Therefore, the same reference numbers are used for the same or similar elements, and any further descriptions concerning the same or similar elements as those shown in FIG. 1 and FIG. 2 will be omitted.

Referring to FIG. 2 and FIG. 7, an alignment substrate 700 in accordance with the present exemplary embodiment includes a first alignment layer 180 formed on the pixel electrode 170. In the present exemplary embodiment, the first alignment layer 180 includes at least two sub-alignment portions in each unit pixel, and each of the sub-alignment portions is photoaligned to have different pretilt directions.

When the unit pixel is divided into at least two domains, the first alignment layer 180 may include at least two sub-alignment portions corresponding to the at least two domains, respectively.

For example, as shown in FIG. 7, when the unit pixel is divided into four domains including a first domain DM1 disposed at the upper left, a second domain DM2 disposed at the upper right, a third domain DM3 disposed at the lower left, and a fourth domain DM4 disposed at the lower right, the first alignment layer 180 includes four sub-alignment portions 181, 182, 183, and 184 corresponding to the four domains DM1, DM2, DM3, and DM4, respectively. For example, the first alignment layer 180 includes a first sub-alignment portion 181 corresponding to the first domain DM1, a second sub-alignment portion 182 corresponding to the second domain DM2, a third sub-alignment portion 183 corresponding to the third domain DM3, and a fourth sub-alignment portion 184 corresponding to the fourth domain DM4.

The first to fourth sub-alignment portions 181, 182, 183, and 184 of the first alignment layer 180 may have different pretilt directions. The direction of arrows shown in FIG. 7 represent two dimensional alignment directions of the first to fourth sub-alignment portions 181, 182, 183, and 184.

In the present exemplary embodiment, the first to fourth pretilt directions of the first to fourth sub-alignment portions 181, 182, 183, and 184 may rotate counterclockwise. For example, pretilt directions of sub-alignment portions bordering on each other may be substantially perpendicular to each other, and pretilt directions of diagonally situated sub-alignment portions may be different at about 180 degrees from each other.

Further, the pretilt direction of the first sub-alignment portion 181 may be directed toward a clockwise direction of 135 degrees with respect to the first direction D1, and the pretilt direction of the second sub-alignment portion 182 may be directed toward a counterclockwise direction of 135 degrees with respect to the first direction D1. The pretilt direction of the third sub-alignment portion 183 may be directed toward a counterclockwise direction of 45 degrees with respect to the first direction D1, and the pretilt direction of the fourth sub-alignment portion 184 may be directed toward a clockwise direction of 45 degrees with respect to the first direction D1.

A method of manufacturing the alignment substrate 700 described with reference to FIG. 7 may be substantially the same as the method described with reference to FIG. 5A, FIG. 5B, FIG. 5C, and FIG. 5D except for a direction in which the UV light is irradiated and an alignment direction of the alignment substrate 700. Therefore, further descriptions will be omitted, and the differences from the method described with reference to FIG. 5A, FIG. 5B, FIG. 5C, and FIG. 5D will be mainly described.

In a first light-exposure process for photoaligning the first to fourth sub-alignment portions 181, 182, 183, and 184 shown in FIG. 7, the UV light proceeds toward the upper direction (i.e., the second direction D2) from the plane in which the first mask MSK1 is disposed, unlike the first light-exposure process described with reference to FIG. 5A. Accordingly, the photoreactive polymer layers formed in the first domain DM1 and the third domain DM3 are photoaligned in the lower direction (i.e., the direction opposite to the second direction D2).

In a second light-exposure process, the UV light proceeds toward the lower direction (i.e., the direction opposite to the second direction D2) from the plane in which the second mask MSK2 is disposed, unlike the second light-exposure process described with reference to FIG. 5B. Accordingly, the photoreactive polymer layers formed in the second domain DM2 and the fourth domain DM4 are photoaligned in the upper direction (i.e., the second direction D2).

In a third light-exposure process, the UV light proceeds toward the right direction (i.e., the first direction D1) from the plane in which the third mask MSK3 is disposed, unlike the third light-exposure process described with reference to FIG. 5C. Accordingly, the pretilt direction of the first sub-alignment portion 181 in the first domain DM1 may be directed toward a clockwise direction of 135 degrees with respect to the first direction D1, as shown in FIG. 7. The pretilt direction of the second sub-alignment portion 182 in the second domain DM2 may be directed toward a counterclockwise direction of 135 degrees with respect to the first direction D1.

In a fourth light-exposure process, the UV light proceeds toward the left direction (i.e., the direction opposite to the first direction D1) from the plane in which the fourth mask MSK4 is disposed, unlike the fourth light-exposure process described with reference to FIG. 5D. Accordingly, the pretilt direction of the third sub-alignment portion 183 in the third domain DM3 may be directed toward a counterclockwise direction of 45 degrees with respect to the first direction D1, as shown in FIG. 7. The pretilt direction of the fourth sub-alignment portion 184 in the fourth domain DM4 may be directed toward a clockwise direction of 45 degrees with respect to the first direction D1.

Figure 8:
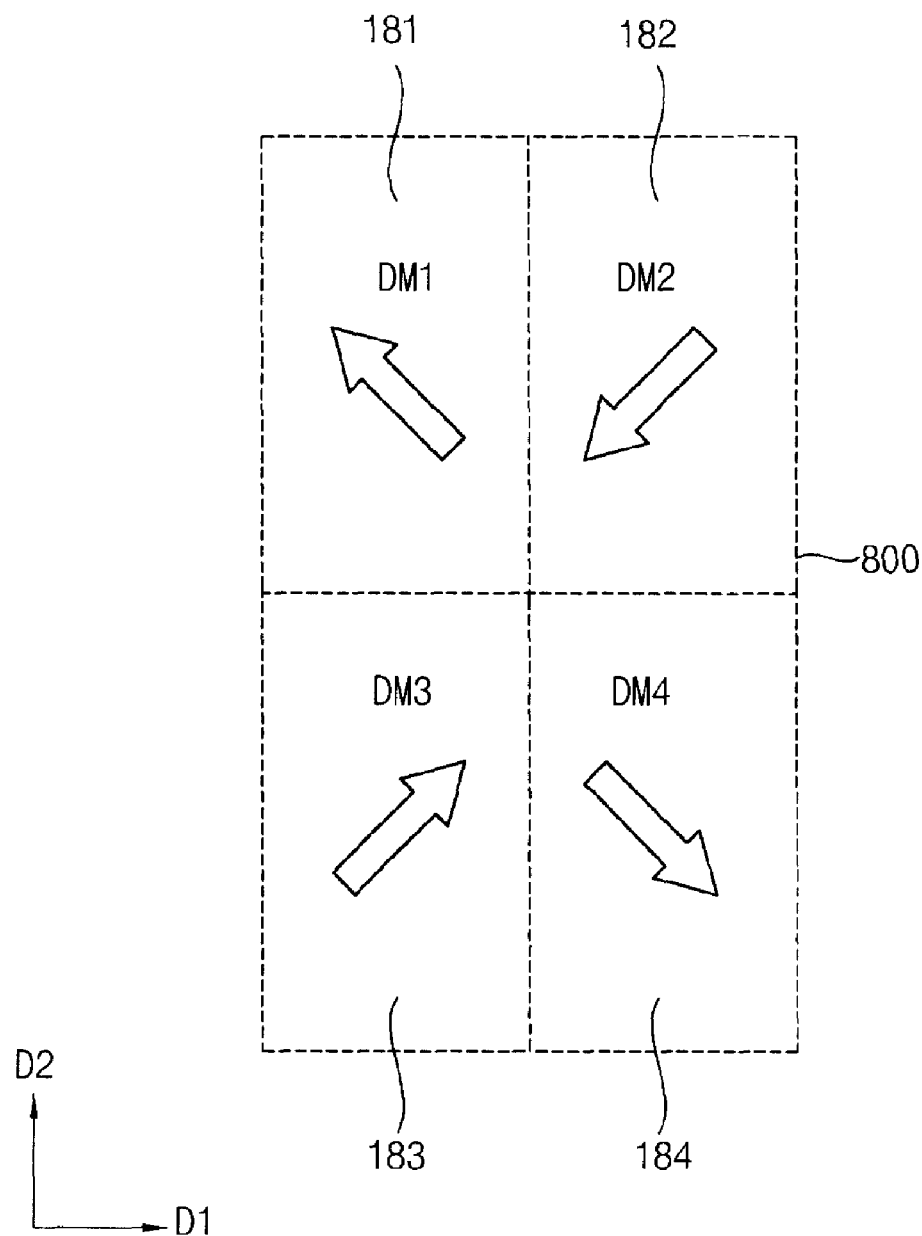
FIG. 8 is a plan view showing an LCD panel in accordance with an exemplary embodiment of the present invention.

FIG. 8 is a plan view showing an LCD panel in accordance with another exemplary embodiment.

The alignment substrate 800 described with reference to FIG. 8 may be substantially the same as the first substrate 100 described with reference to FIG. 1 and FIG. 2 except for pretilt directions of sub-alignment portions corresponding to the domains DM1, DM2, DM3, and DM4. Therefore, the same reference numbers are used for the same or similar elements, and any further descriptions concerning the same or similar elements as those shown in FIG. 1 and FIG. 2 will be omitted.

In the present exemplary embodiment, the first pretilt direction of the first sub-alignment portion 181 and the fourth pretilt direction of the fourth sub-alignment portion 184 may diverge from a center portion of the unit pixel area, and the second pretilt direction of the second sub-alignment portion 182 and the third pretilt direction of the third sub-alignment portion 183 may converge on the center portion of the unit pixel area.

In order to form the alignment layer having the pretilt directions of the first to fourth sub-alignment portions 181, 182, 183, and 184 shown in FIG. 8, polarized UV light directed toward the second direction D2 is irradiated to the alignment layer in the first light-exposure process described with reference to FIG. 5A, and polarized UV light directed toward the direction opposite to the second direction D2 is irradiated to the alignment layer in the second light-exposure process described with reference to FIG. 5B. Further, polarized UV light directed toward the direction opposite to the first direction D1 is irradiated to the alignment layer in the third light-exposure process described with reference to FIG. 5C, and polarized UV light directed toward the first direction D1 is irradiated to the alignment layer in the fourth light-exposure process described with reference to FIG. 5D.

Alternatively, the first pretilt direction of the first sub-alignment portion 181 and the fourth pretilt direction of the fourth sub-alignment portion 184 may converge on the center portion of the unit pixel area, and the second pretilt direction of the second sub-alignment portion 182 and the third pretilt direction of the third sub-alignment portion 183 may diverge from the center portion of the unit pixel area. In order to form the above-mentioned alignment layer, polarized UV light directed toward the direction opposite to the second direction D2 is irradiated to the alignment layer in the first light-exposure process described with reference to FIG. 5A, and polarized UV light directed toward the second direction D2 is irradiated to the alignment layer in the second light-exposure process described with reference to FIG. 5B. Further, polarized UV light directed toward the first direction D1 is irradiated to the alignment layer in the third light-exposure process described with reference to FIG. 5C, and polarized UV light directed toward the direction opposite to the first direction D1 is irradiated to the alignment layer in the fourth light-exposure process described with reference to FIG. 5D.

A method of manufacturing the alignment substrate 800 described with reference to FIG. 8 may be substantially the same as the method described with reference to FIG. 5A, FIG. 5B, FIG. 5C, and FIG. 5D except for a direction in which the UV light is irradiated and an alignment direction of the alignment substrate 800. Therefore, further descriptions will be omitted.

According to the exemplary embodiments of the present invention, all sub-alignment portions of an alignment layer for forming a multi-domain structure are formed on one substrate, so that alignment direction errors may be prevented even though two substrates of an LCD panel are misaligned.

That is, alignment direction errors of the alignment layer may be prevented even though the second substrate has no arrangement indicator for accurately arranging the two substrates.

Accordingly, a viewing angle may be broadened, and the quality and productivity of the LCD panel may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing an alignment substrate, comprising:
   forming a photoreactive layer on a base substrate in which a plurality of unit pixels is defined; and
   forming an alignment layer on the base substrate by irradiating light to the photoreactive layer, the alignment layer comprising at least two sub-alignment portions dividing a unit pixel into at least two domains, and each domain having a different pretilt direction from the other domains,
   wherein the pretilt direction of each domain corresponds to a vector sum of directions opposite to which the light is irradiated into each domain.

2. The method of claim 1, wherein forming the alignment layer comprises exposing one domain to a first light, the one domain being selected from at least two domains divided along a first direction of the unit pixel, the other domains being blocked from the first light, and the exposed domain is selected successively along the first direction.

3. The method of claim 2, wherein forming the alignment layer further comprises exposing one domain to a second light, the one domain being selected from at least two domains divided along a second direction of the unit pixel, the other domains being blocked from the second light, and the exposed domain is selected successively along the second direction, wherein the second direction is substantially perpendicular to the first direction.

4. The method of claim 3, wherein an optical energy of the first light is larger than that of the second light.

5. The method of claim 4, wherein the optical energy of the first light ranges from about 40 mJ/cm$^2$ to about 1000 mJ/cm$^2$.

6. The method of claim 5, wherein the optical energy of the second light ranges from about 20 mJ/cm$^2$ to about 100 mJ/cm$^2$.

7. The method of claim 1, wherein each unit pixel is divided into at least four domains comprising a first domain disposed at the upper left, a second domain disposed at the upper right, a third domain disposed at the lower left, and a fourth domain disposed at the lower right, and
   wherein forming the alignment layer comprises:
   performing a first light-exposure process by exposing the upper left of the unit pixel and the lower left of the unit pixel at a left half of the alignment layer to the light, while blocking the upper right of the unit pixel and the lower right of the unit pixel at a right half of the alignment layer from the light;
   performing a second light-exposure process by exposing the upper right of the unit pixel and the lower right of the unit pixel at the right half of the alignment layer to the light, while blocking the upper left of the unit pixel and the lower left of the unit pixel at the left half of the alignment layer from the light;
   performing a third light-exposure process by exposing the upper left of the unit pixel and the upper right of the unit pixel at an upper half of the alignment layer to the light, while blocking the lower left of the unit pixel and the lower right of the unit pixel at a lower half of the alignment layer from the light; and
   performing a fourth light-exposure process by exposing the lower left of the unit pixel and the lower right of the unit pixel at the lower half of the alignment layer to the light, while blocking the upper left of the unit pixel and the upper right of the unit pixel at the upper half of the alignment layer from the light.

8. The method of claim 7, wherein the first light-exposure process comprises irradiating polarized ultraviolet (UV) light directed toward a second direction in a plane of the alignment layer, and the second light-exposure process comprises irradiating polarized UV light directed toward a direction opposite to the second direction in the plane of the alignment layer,
   wherein the third light-exposure process comprises irradiating polarized UV light directed toward a first direction in the plane of the alignment layer, and the fourth light-exposure process comprises irradiating polarized UV light directed toward a direction opposite to the first direction in the plane of the alignment layer, and wherein the first direction is a direction directed from a left side of the unit pixel to a right side of the unit pixel, and the second direction is a direction directed from a lower side of the unit pixel to an upper side of the unit pixel.

9. The method of claim 7, wherein the first light-exposure process comprises irradiating polarized UV light directed toward a direction opposite to a second direction in a plane of the alignment layer, and the second light-exposure process comprises irradiating polarized UV light directed toward the second direction in the plane of the alignment layer,
wherein the third light-exposure process comprises irradiating polarized UV light directed toward a direction opposite to a first direction in the plane of the alignment layer, and the fourth light-exposure process comprises irradiating polarized UV light directed toward the first direction in the plane of the alignment layer, and
wherein the first direction is a direction directed from a left side of the unit pixel to a right side of the unit pixel, and the second direction is a direction directed from a lower side of the unit pixel to an upper side of the unit pixel.

10. The method of claim 7, wherein the first light-exposure process comprises irradiating polarized UV light directed toward a second direction in a plane of the alignment layer, and the second light-exposure process comprises irradiating polarized UV light directed toward a direction opposite to the second direction in the plane of the alignment layer,
wherein the third light-exposure process comprises irradiating polarized UV light directed toward a direction opposite to a first direction in the plane of the alignment layer, and the fourth light-exposure process comprises irradiating polarized UV light directed toward the first direction in the plane of the alignment layer, and
wherein the first direction is a direction directed from a left side of the unit pixel to a right side of the unit pixel, and the second direction is a direction directed from a lower side of the unit pixel to an upper side of the unit pixel.

11. The method of claim 7, wherein the first light-exposure process comprises irradiating polarized UV light directed toward a direction opposite to a second direction in a plane of the alignment layer, and the second light-exposure process comprises irradiating polarized UV light directed toward the second direction in the plane of the alignment layer,
wherein the third light-exposure process comprises irradiating polarized UV light directed toward a first direction in the plane of the alignment layer, and the fourth light-exposure process comprises irradiating polarized UV light directed toward a direction opposite to the first direction in the plane of the alignment layer, and
wherein the first direction is a direction directed from a left side of the unit pixel to a right side of the unit pixel, and the second direction is a direction directed from a lower side of the unit pixel to an upper side of the unit pixel.

12. The method of claim 1, wherein pretilt directions of domains adjacent to each other have a difference angle of about 90 degrees.

13. The method of claim 1, wherein the pretilt directions of at least one domain converges on the center portion of the unit pixel and the pretilt direction of at least one domain diverges from a center portion of the unit pixel.

14. The method of claim 1, wherein the unit pixel is divided into four domains,
wherein the pretilt directions of two domains in the unit pixel diverge from the center portion of the unit pixel, and
the pretilt directions of other two domains in the unit pixel converge on the center portion of the unit pixel.

15. The method of claim 1, wherein the unit pixel is divided into four domains comprising a upper left domain, a upper right domain, a lower left domain, and a lower right domain,
wherein the pretilt directions of the upper left domain and lower right domain diverge from the center portion of the unit pixel, and
the pretilt directions of the upper right domain and the lower left domain converge on the center portion of the unit pixel.

16. The method of claim 1, wherein the unit pixel is divided into four domains comprising a upper left domain, a upper right domain, a lower left domain, and a lower right domain,
wherein the pretilt directions of the upper right domain and the lower left domain diverges from the center portion of the unit pixel, and
the pretilt directions of the upper left domain and lower right domain converge on the center portion of the unit pixel.

17. A method of manufacturing an alignment substrate, comprising:
forming a photoreactive layer on a base substrate in which a plurality of unit pixels is defined; and
forming an alignment layer on the base substrate by irradiating light to the photoreactive layer, the alignment layer comprising at least two sub-alignment portions dividing a unit pixel into at least two domains, each sub-alignment portion being arranged in a different domain of the at least two domains and being aligned to have a different pretilt direction from the other sub-alignment portions,
wherein each unit pixel is divided into at least four domains comprising a first domain disposed at the upper left, a second domain disposed at the upper right, a third domain disposed at the lower left, and a fourth domain disposed at the lower right, and
wherein forming the alignment layer comprises:
performing a first light-exposure process by exposing the upper left of the unit pixel and the lower left of the unit pixel at a left half of the alignment layer to the light, while blocking the upper right of the unit pixel and the lower right of the unit pixel at a right half of the alignment layer from the light;
performing a second light-exposure process by exposing the upper right of the unit pixel and the lower right of the unit pixel at the right half of the alignment layer to the light, while blocking the upper left of the unit pixel and the lower left of the unit pixel at the left half of the alignment layer from the light;
performing a third light-exposure process by exposing the upper left of the unit pixel and the upper right of the unit pixel at an upper half of the alignment layer to the light, while blocking the lower left of the unit pixel and the lower right of the unit pixel at a lower half of the alignment layer from the light; and
performing a fourth light-exposure process by exposing the lower left of the unit pixel and the lower right of the unit pixel at the lower half of the alignment layer to the light, while blocking the upper left of the unit pixel and the upper right of the unit pixel at the upper half of the alignment layer from the light.

18. The method of claim 17, wherein the first light-exposure process comprises irradiating polarized UV light directed toward a second direction in a plane of the alignment layer, and the second light-exposure process comprises irradiating polarized UV light directed toward a direction opposite to the second direction in the plane of the alignment layer, wherein the third light-exposure process comprises irradiating polarized UV light directed toward a direction opposite to a first direction in the plane of the alignment layer, and the fourth light-exposure process comprises irradiating polarized UV light directed toward the first direction in the plane of the alignment layer, and wherein the first direction is a direction directed from a left side of the unit pixel to a right side of the unit pixel, and the second direction is a direction directed from a lower side of the unit pixel to an upper side of the unit pixel.

19. The method of claim 17, wherein the first light-exposure process comprises irradiating polarized UV light directed toward a direction opposite to a second direction in a plane of the alignment layer, and the second light-exposure process comprises irradiating polarized UV light directed toward the second direction in the plane of the alignment layer, wherein the third light-exposure process comprises irradiating polarized UV light directed toward a first direction in the plane of the alignment layer, and the fourth light-exposure process comprises irradiating polarized UV light directed toward a direction opposite to the first direction in the plane of the alignment layer, and wherein the first direction is a direction directed from a left side of the unit pixel to a right side of the unit pixel, and the second direction is a direction directed from a lower side of the unit pixel to an upper side of the unit pixel.

20. A method of manufacturing an alignment substrate, comprising:
   forming a photoreactive layer on a base substrate comprising a plurality of unit pixels;
   irradiating light to the photoreactive layer positioned in a first orientation; and
   irradiating light to the photoreactive layer positioned in a second orientation,
   wherein a first alignment layer comprises at least two sub-alignment portions dividing a unit pixel into at least two domains, each sub-alignment portion arranged in a different domain of the at least two domains and aligned to have a different pretilt direction from the other sub-alignment portions, and
   wherein the prelit direction of each domain corresponds to a vector sum of directions opposite to which the light is irradiated into each domain.

* * * * *